United States Patent
Blustein et al.

(10) Patent No.: US 12,327,271 B2
(45) Date of Patent: Jun. 10, 2025

(54) SYSTEMS AND METHODS FOR HEALTH CARE PROVIDER ENGAGEMENT

(71) Applicant: Aktana, Inc., San Francisco, CA (US)

(72) Inventors: Gil Blustein, San Francisco, CA (US); Jin Huang, San Francisco, CA (US); Marc Cohen, San Francisco, CA (US); Wendong Zhu, San Francisco, CA (US)

(73) Assignee: Aktana, Inc., San Francisco, CA (US)

( * ) Notice: Subject to any disclaimer, the term of this patent is extended or adjusted under 35 U.S.C. 154(b) by 0 days.

(21) Appl. No.: 17/568,522

(22) Filed: Jan. 4, 2022

(65) Prior Publication Data

US 2022/0277355 A1    Sep. 1, 2022

Related U.S. Application Data

(63) Continuation of application No. PCT/US2020/033654, filed on May 19, 2020.
(Continued)

(51) Int. Cl.
*G16H 50/00*        (2018.01)
*G06Q 30/0241*    (2023.01)
(Continued)

(52) U.S. Cl.
CPC ..... *G06Q 30/0276* (2013.01); *G06Q 30/0244* (2013.01); *G06Q 30/0254* (2013.01);
(Continued)

(58) Field of Classification Search
None
See application file for complete search history.

(56) References Cited

U.S. PATENT DOCUMENTS

| 8,744,890 B1 | 6/2014 | Bernier et al. |
| 9,335,911 B1 | 5/2016 | Elliot et al. |

(Continued)

FOREIGN PATENT DOCUMENTS

| JP | 2001202178 A | 7/2001 |
| JP | 2019507423 A | 3/2019 |

(Continued)

OTHER PUBLICATIONS

Al-Tanir; Patient experiences of engagement; BioMed Central; 9 pages; 2017.*

(Continued)

*Primary Examiner* — Radu Andrei
(74) *Attorney, Agent, or Firm* — WILSON SONSINI GOODRICH & ROSATI

(57) ABSTRACT

A health care provider (HCP) engagement engine is disclosed. The HCP engagement engine facilitates effective communication between pharmaceutical sales representatives (medical reps) and HCPs by generating, using machine learning algorithms, messages for the medical reps to send to HCPs. The recommended messages may be sent over a network and may include email messages, text messages, or online chat messages. The recommended messages may be drafted entirely by the engagement engine or may be drafted as addenda to messages already used by the medical reps. The HCP engagement engine uses historical data on actions performed by the HCPs and medical reps, as well as data collected from historical message recommendation events, in order to produce message recommendations.

19 Claims, 12 Drawing Sheets

Related U.S. Application Data

(60) Provisional application No. 62/871,642, filed on Jul. 8, 2019.

(51) Int. Cl.
  G06Q 30/0242 (2023.01)
  G06Q 30/0251 (2023.01)
  *G06N 20/00* (2019.01)

(52) U.S. Cl.
  CPC ..... G06Q 30/0255 (2013.01); G06Q 30/0264 (2013.01); *G06N 20/00* (2019.01)

(56) References Cited

U.S. PATENT DOCUMENTS

| | | |
|---|---|---|
| 9,424,669 B1 | 8/2016 | Lu et al. |
| 9,639,580 B1 | 5/2017 | Xing |
| 10,783,553 B2* | 9/2020 | Agarwal ................. G06N 5/04 |
| 2004/0093429 A1* | 5/2004 | Henry Burton ...... G06Q 10/107 709/242 |
| 2010/0332287 A1 | 12/2010 | Gates et al. |
| 2011/0066571 A1* | 3/2011 | Goodman ............. G06Q 30/02 705/36 R |
| 2011/0296012 A1* | 12/2011 | Malloy ............... G06F 11/3495 709/224 |
| 2013/0024273 A1* | 1/2013 | Stark ..................... G06Q 30/00 705/14.43 |
| 2013/0073277 A1* | 3/2013 | Mills ..................... G06F 40/131 704/9 |
| 2013/0073279 A1* | 3/2013 | Mills ..................... G06F 40/131 704/9 |
| 2014/0025376 A1 | 1/2014 | Wasserblat et al. |
| 2015/0350144 A1 | 12/2015 | Zeng et al. |
| 2017/0076321 A1* | 3/2017 | Reznek ............. G06Q 30/0246 |
| 2017/0124593 A1* | 5/2017 | Nickerson .......... G06Q 30/0269 |
| 2019/0121856 A1* | 4/2019 | Terry ...................... G06F 40/30 |
| 2019/0205939 A1* | 7/2019 | Lal ........................ G06N 3/045 |
| 2020/0027100 A1 | 1/2020 | Cohen et al. |
| 2022/0086115 A1* | 3/2022 | Swartz ................. H04L 51/043 |
| 2022/0277355 A1 | 9/2022 | Blustein et al. |
| 2023/0045502 A1 | 2/2023 | Blustein et al. |

FOREIGN PATENT DOCUMENTS

| | | |
|---|---|---|
| WO | WO-2021006957 A1 | 1/2021 |
| WO | WO-2021173714 A1 | 9/2021 |

OTHER PUBLICATIONS

Goodridge; Patient, family engagement; BioMed Central; 7 pages; 2018.*

EP21759523.0 Extended European Search Report dated Nov. 13, 2023.

Mistry, et al. Performance Measurement in the Pharmaceutical Industry: Dr. Reddy's Laboratories, Ltd. IEEE Engineering Management Review 46(1):52-64 (2018).

PCT/US2021/019469 International Search Report and Written Opinion dated May 6, 2021.

U.S. Appl. No. 17/819,029 Office Action dated Jun. 3, 2024.

Aktana's Newest Release Enables Pharmaceutical Marketing and Sales Teams to Significantly Optimize Execution of Brand Strategies. Press Release. Aktana (Oct. 17, 2017). Retrieved Aug. 14, 2020 from URL: https://www.aktana.com/wp-content/uploads/Aktana%E2%80%99s-newest-release-enables-pharmaceutical-marketing-and-sales-teams-to-significantly-optimize-execution-of-brand-strategies.pdf. 2 pages.

PCT/US2020/033654 International Search Report and Written Opinion dated Jul. 30, 2020.

\* cited by examiner

Last, First
Message 1

Last, First
Message 2

Last, First
Message 3

Last, First
Message 4

Last, First
Message 5

Last, First
Message 6

Last, First
Message 7

From: pharmrep@email.com

To: drdr@email.com

CC:

Subject: New Product

Dear Dr. Doctor,

I hope your talk at M&DM West went well. Attached is some information about the product I'm trying to sell you. Please let me know if you have any questions.

Regards,
A Pharma Rep

Message Open Action Sent to Servers

| accountid | messageAlgorithmid | messageid | modelid | probability | p |
|---|---|---|---|---|---|
| 1002 | 44 | 1598 | 9951d193-7eed-49ea-85aa-681fa1e2b943 | 0.012043276345086l | |
| 1002 | 44 | 1639 | 9951d193-7eed-49ea-85aa-681fa1e2b943 | 0.3329765023905554 | |
| 1002 | 44 | 1806 | 9951d193-7eed-49ea-85aa-681fa1e2b943 | 0.0105377103639453 | |
| 1002 | 44 | 1812 | 9951d193-7eed-49ea-85aa-681fa1e2b943 | 0.0156142992796946 | |
| 1003 | 44 | 1598 | 9951d193-7eed-49ea-85aa-681fa1e2b943 | 0.0120736052383167 | |
| 1003 | 44 | 1639 | 9951d193-7eed-49ea-85aa-681fa1e2b943 | 0.0820077905609743 | |
| 1003 | 44 | 1806 | 9951d193-7eed-49ea-85aa-681fa1e2b943 | 0.0007624294650688886 | |
| 1003 | 44 | 1812 | 9951d193-7eed-49ea-85aa-681fa1e2b943 | 0.0374381265920982 | |
| 1006 | 44 | 1598 | 9951d193-7eed-49ea-85aa-681fa1e2b943 | 0.0114746726480814 | |
| 1006 | 44 | 1639 | 9951d193-7eed-49ea-85aa-681fa1e2b943 | 0.3237039475911463 | |
| 1006 | 44 | 1806 | 9951d193-7eed-49ea-85aa-681fa1e2b943 | 0.0105377103639453 | |
| 1006 | 44 | 1812 | 9951d193-7eed-49ea-85aa-681fa1e2b943 | 0.0107171978099114 | |
| 1007 | 44 | 1598 | 9951d193-7eed-49ea-85aa-681fa1e2b943 | 0.0113456628040427 | |
| 1007 | 44 | 1639 | 9951d193-7eed-49ea-85aa-681fa1e2b943 | 0.3601980376821222 | |
| 1007 | 44 | 1806 | 9951d193-7eed-49ea-85aa-681fa1e2b943 | 0.0007624294650688886 | |
| 1007 | 44 | 1812 | 9951d193-7eed-49ea-85aa-681fa1e2b943 | 0.0423988379121638 | |
| 1009 | 44 | 1598 | 9951d193-7eed-49ea-85aa-681fa1e2b943 | 0.0114746726480814 | |
| 1009 | 44 | 1639 | 9951d193-7eed-49ea-85aa-681fa1e2b943 | 0.2602363427753053 | |
| 1009 | 44 | 1806 | 9951d193-7eed-49ea-85aa-681fa1e2b943 | 0.0007624294650688886 | |
| 1009 | 44 | 1812 | 9951d193-7eed-49ea-85aa-681fa1e2b943 | 0.0137140370605348 | |
| 1010 | 44 | 1598 | 9951d193-7eed-49ea-85aa-681fa1e2b943 | 0.0114953740712608 | |
| 1010 | 44 | 1639 | 9951d193-7eed-49ea-85aa-681fa1e2b943 | 0.0408373676715958 | |
| 1010 | 44 | 1806 | 9951d193-7eed-49ea-85aa-681fa1e2b943 | 0.0007624294650688886 | |

FIG. 7

SYSTEMS AND METHODS FOR HEALTH CARE PROVIDER ENGAGEMENT

CROSS-REFERENCE TO RELATED APPLICATIONS

This application is a Continuation application of International Patent Application PCT/US2020/033654, filed May 19, 2020, which claims priority to U.S. Patent Application No. 62/871,642, filed on Jul. 8, 2019, each of which is incorporated by reference herein in its entirety.

BACKGROUND

Medical sales representatives ("medical reps") may use different methods when promoting to doctors or other health care providers (HCPs) to purchase their companies' drugs and treatments. For example, medical sales reps may give HCPs promotional merchandise, invite them to speak at conferences, etc. In order to engage with HCPs, medical sales reps may communicate with them using different methods, including in-person meetings, phone calls, instant messaging, email, and mail. In order to effectively communicate with HCPs, pharmaceutical reps may need to build relationships with the HCPs in order to establish levels of knowledge and rapport.

When pharmaceutical reps communicate with HCPs, they often rely on their own personal relationships with the HCPs and their own intuition in order to market the products and services. However, pharmaceutical reps often do not have empirical methods to complement or enhance their marketing efforts, and as such their sales and marketing efforts is largely a subjective process. Data collection can be difficult, and thus effectiveness can be difficult to measure. In addition, computer-generated or standardized sales processes often lack the personal touches that enable medical reps to successfully sell products to the HCPs with whom they have relationships. Because the medical reps may be unable to synthesize data-driven methods with their personal relationships, they may be hindered from making successful sales or greater number of sales.

SUMMARY

Accordingly, there is a need for medical reps to be able to supplement their personal relationships with HCPs with empirically determined methods, in order to increase the chances of making successful sales.

In one aspect, a computer-implemented method for enhancing a user's engagement or action with a target customer to increase marketing effectiveness is disclosed.

The method includes receiving customer data from one or more devices associated with the target customer, wherein the customer data comprises information pertaining to one or more actions taken by the target customer in response to at least one message sent by the user to the target customer, wherein the message is associated with marketing or sales of a pharmaceutical product;

The method includes aggregating the customer data from the one or more devices over a plurality of different time periods The method finally includes analyzing the aggregated customer data with aid of a machine learning algorithm to determine one or more recommendations to the user for enhancing the user's engagement or action with the target customer, wherein the one or more recommendations comprise (1) temporal insights and (2) contextual insights for increasing a likelihood of the user effectively engaging or interacting with the target customer relating to the marketing or sales of the pharmaceutical product.

In some embodiments, the target customer includes one or more health care practitioners, and wherein the user includes one or more sales representatives for the pharmaceutical product.

In some embodiments, the one or more actions taken by the target customer include (a) opening the message, (b) clicking on content or a hyperlink within the message, (c) replying to the message, (d) forwarding the message to one or more other parties, (e) deleting the message, (f) archiving the message, (g) posting or sharing the message on social media or a website, or (h) inaction or lack of action taken with respect to the message.

In some embodiments, the at least one message comprises a plurality of messages sent by the user to the target customer over the plurality of different time periods.

In some embodiments, the aggregated customer data comprises time series data including timestamps associated with one or more of the following events or actions: (1) a time instant $t1$ at which the message is transmitted to the target customer's device(s); (2) a time instant $t2$ at which the message is received by the target customer's device(s); (3) a time duration $t3$ for which the message has yet to be opened by the target customer; (4) a time instant $t4$ at which the target customer opens the message; (5) a time duration $t5$ for which the message is being opened; (6) a time instant $t6$ at which the target customer clicks on content or a hyperlink within the message; (7) a time instant $t7$ at which the target customer closes the message; (8) a time instant $t8$ at which the target customer replies to the user's message; (9) a time duration $t9$ for which the target customer spends replying to the user's message; (10) a time instant $t10$ at which the target customer forwards the user's message to one or more other parties; (11) a time instant $t11$ at which the target customer archives the message; or (12) a time instant $t12$ at which the target customer deletes the message.

In some embodiments, the plurality of different time periods is defined in different time intervals on the order of hours, days, weeks, or months.

In some embodiments, the plurality of different time periods comprises different temporal segments that are overlapping or non-overlapping.

In some embodiments, the temporal insights in the one or more recommendations comprise a suggested timing for the user to deliver a follow-on message to the target customer, and wherein the suggested timing comprises a specific time or timeslot on a specific day(s) of a week or month.

In some embodiments, the contextual insights in the one or more recommendations comprise a suggested follow-on message for the user to deliver to the target customer, and wherein the suggested follow-on message comprises topics, subjects or keywords relating to the pharmaceutical product that are determined to be of interest or relevance to the target customer.

In some embodiments, the topics, subjects or keywords are determined to be of interest or relevance to the target customer based on one or more of the following: (1) a profile of the target customer; (2) information about the target customer obtained directly or indirectly from a plurality of sources; (3) information about one or more conferences or events that the target customer has attended, is attending, or planning to attend; (4) articles written or published by the target customer; (5) talks or presentations given by the target customer; (6) online content posted by the target customer; (7) news, reviews, or articles about the target customer posted by third parties or individuals affiliated with the target customer; or (8) other pharmaceutical products that are currently being used or endorsed, or that had been previously used or endorsed by the target customer.

In some embodiments, the one or more recommendations further comprise: (3) insights on modes or channels of communications for increasing the likelihood of the user effectively engaging or interacting with the target customer relating to the marketing or sales of the pharmaceutical product.

In some embodiments, the modes or channels of communications comprise one or more of the following: (1) email communications; (2) mobile text messages; (3) social media websites; (4) mobile applications; (5) telephone calls; (6) in-person meetings; (7) video conferencing; (8) conferences or seminars; or (9) events conducted at the target customer's work facility.

In some embodiments, the method further comprises providing the one or more recommendations to one or more devices associated with the user. The method also comprises displaying the one or more recommendations as one or more visual graphical objects on the user's device(s).

In some embodiments, the one or more visual graphical objects are configured to allow the user to perform one or more of the following actions: (1) accept the one or more recommendations; (2) reject the one or more recommendations; (3) mark the one or more recommendations with a status marker; or (4) provide feedback on the one or more recommendations.

In some embodiments, the status marker comprises a to-do action or a completed action.

In some embodiments, the method further comprises receiving user data from the one or more devices associated with the user, wherein the user data comprises information pertaining to one or more actions taken by the user based on the one or more recommendations. The method also comprises aggregating the user data over the plurality of different time periods. Finally, the method comprises analyzing the aggregated user data and the aggregated customer data with aid of the machine learning algorithm to determine an effectiveness of the recommendation(s) and the user's action(s) in enhancing the user's engagement or action with the target customer.

In some embodiments, the effectiveness of the one or more recommendations is provided as a score for each of the recommendation(s).

In some embodiments, the method further comprises modifying one or more subsequent recommendations to the user to improve their effectiveness, based on the scores of one or more previous recommendations to the user.

In some embodiments, the machine learning algorithm is based on Message Sequence Optimization (MSO).

In some embodiments, the MSO-based machine learning algorithm comprises a random forest algorithm.

In some embodiments, the machine learning algorithm is used to generate a decision model.

In some embodiments, the one or more recommendations are configured to maximize a likelihood of the target customer clicking or opening an existing message or a next message from the user.

In some embodiments, the decision model is based on (1) individual historical behavior of the target customer with respect to messages sent by the user and (2) aggregated historical behaviors of a population of different target customers with respect to messages sent by a plurality of different users.

In some embodiments, the machine learning algorithm is selected from the group consisting of a boosted decision tree, a classification tree, a regression tree, a bagging tree, a random forest, a neural network, and a rotational forest.

In some embodiments, the method further comprises providing, to the decision model, new customer data associated with one or more new actions taken by the target customer in response to the at least one message sent by the user to the target customer. The method additionally comprises training the decision model by modifying the decision model to account for the relevance of the new customer data and new actions when determining the one or more recommendations for the user.

In some aspects, a system for enhancing a user's engagement or action with a target customer to increase marketing effectiveness is disclosed. The system comprises a server in communication with one or devices associated with the target customer, and a memory storing instructions that, when executed by the server, cause the server to perform operations. The operations comprise receiving customer data from the one or more devices associated with the target customer. The data comprises information pertaining to one or more actions taken by the target customer in response to at least one message sent by the user to the target customer. The message is associated with marketing or sales of a pharmaceutical product. The operations further comprise aggregating the customer data from the one or more devices over a plurality of different time periods, and analyzing the aggregated customer data with aid of a machine learning algorithm to determine one or more recommendations to the user for enhancing the user's engagement or action with the target customer. The one or more recommendations comprise (1) temporal insights and (2) contextual insights for increasing a likelihood of the user effectively engaging or interacting with the target customer relating to the marketing or sales of the pharmaceutical product.

In some embodiments, the server is in communication with one or more devices associated with the target customer. The server is configured to perform operations comprising receiving user data from the one or more devices associated with the user. The user data comprises information pertaining to one or more actions taken by the user based on the one or more recommendations. The operations further comprise aggregating the user data over the plurality of different time periods, and analyzing the aggregated user data and the aggregated customer data with aid of the machine learning algorithm to determine an effectiveness of the recommendation(s) and the user's action(s) in enhancing the user's engagement or action with the target customer.

A non-transitory computer-readable storage medium including instructions that, when executed by a server, cause the server to perform operations. The operations comprise receiving customer data from one or more devices associated with the target customer. The customer data comprises information pertaining to one or more actions taken by the target customer in response to at least one message sent by the user to the target customer. The message is associated with marketing or sales of a pharmaceutical product. The operations further comprise aggregating the customer data from the one or more devices over a plurality of different time periods and analyzing the aggregated customer data with aid of a machine learning algorithm to determine one or more recommendations to the user for enhancing the user's engagement or action with the target customer. The one or more recommendations comprise (1) temporal insights and (2) contextual insights for increasing a likelihood of the user effectively engaging or interacting with the target customer relating to the marketing or sales of the pharmaceutical product.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 5B shows an illustration of an HCP's mail client;

FIG. 6 shows sample input data processed by the system FIG. 7 shows sample output recommendation data from the system;

DETAILED DESCRIPTION

Figure 1:
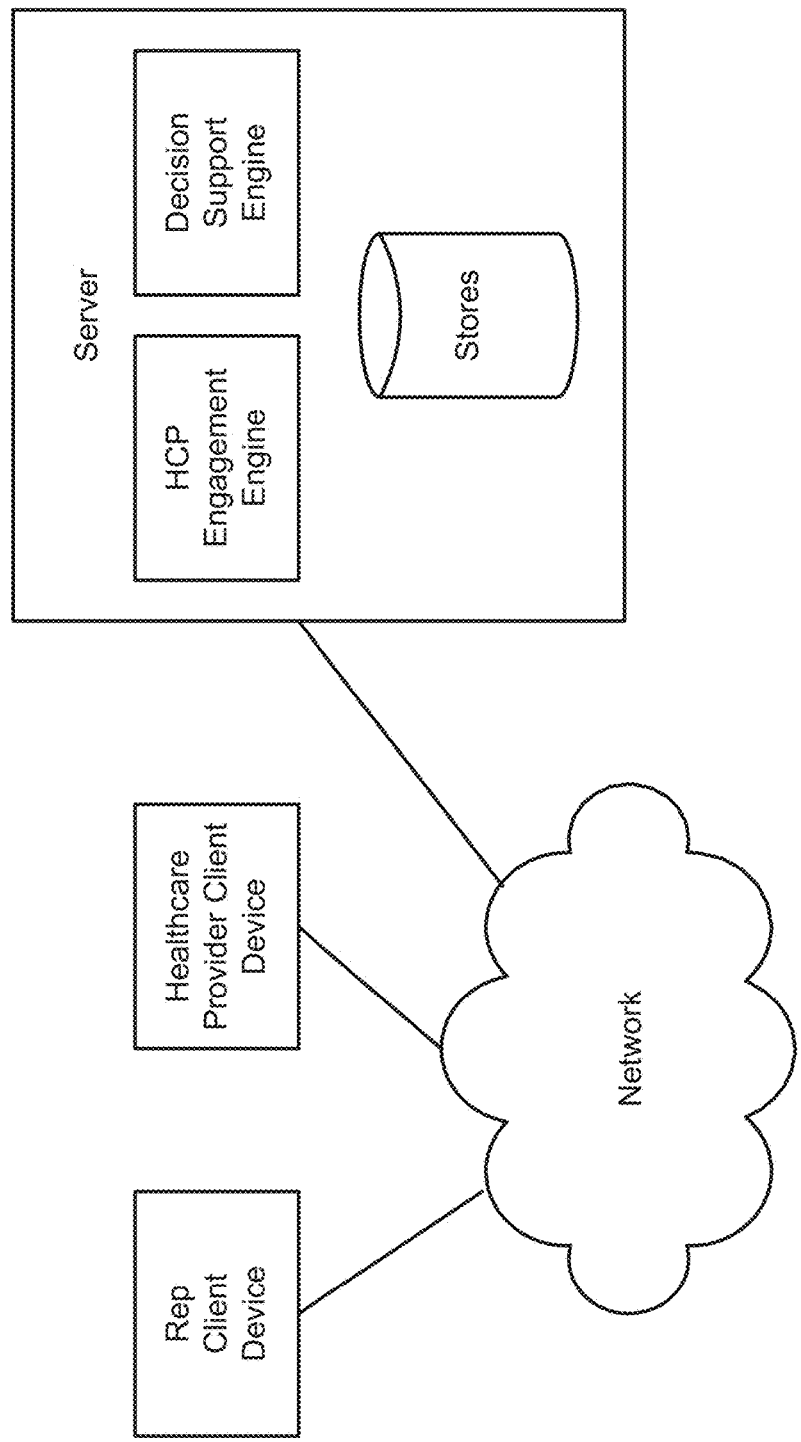
FIG. 1 shows a system for implementing a health care provider engagement engine.

The disclosed system and methods can generate recommended targeted messages for medical reps (e.g., pharmaceutical sales representatives (pharma reps), medical device sales reps) to send to healthcare providers (HCPs), in order to improve or enhance engagement with the HCPs. The system may provide the recommended targeted messages to a publisher, who may then in turn provide them to medical reps for presentation to HCPs. The system may comprise an HCP engagement engine configured to supplement existing sales and marketing techniques used by the medical reps. The HCP engagement engine can be configured to perform machine learning analysis on actions of the HCPs performed in response to messages that the HCPs receive from medical reps, as well as additional demographic data of individual HCPs. Cataloging the performed HCP actions can allow data to be collected to determine which methods of communicating with HCPs are most effective. The actions of the HCPs can be analyzed by one or more machine learning algorithms to produce recommendations to medical reps of messages to send HCPs that are predicted to have a high probability of being effective. Effectiveness may be measured by determining a probability that an HCP would be prompted to take a desired action, such as opening a message or responding to a message. When these recommendations are taken, the actions performed by the HCP recipients can be collected, thus adding more data into the system. This feedback process can enable the machine learning algorithms to continuously learn and generate improved or more targeted recommendations.

Actions taken by the HCPs that are collected by the system disclosed herein relate to the messages they receive from medical reps. For example, HCPs may open, reply to, or ignore messages from one or more of the medical reps. These actions can be provided to and collected by the system. When it logs an action, the system may collect additional information. For example, the system may also log a time at which a particular action was taken, a frequency with which particular actions are taken, and a time interval in between particular actions. The disclosed system may also log actions from medical reps. For example, the disclosed system may log send events by medical reps to HCPs. The system may log repeat send actions of particular messages, or the duration between an initial message and a follow-up message.

The HCP engagement engine can include multiple stages for producing recommendations. The HCP engagement engine may contain multiple machine learning models, which may be appropriate in different contexts for contacting different HCPs. For example, the HCP engagement engine may first choose a model, then train the model for a particular HCP, and then use the model to produce one or more recommendations. Training may proceed differently for different HCPs, depending on the data that is available and the time scale over which training may occur. The HCP engagement engine may also use a message sequence model to select a sequence of messages to send to an HCP. The model may generate words or phrases recommended for insertion into a communication message to an HCP. The message sequence model may also be referred to as a "message sequence optimization" (MSO) model.

In some embodiments, the HCP engagement engine may include a random forest algorithm to generate recommended messages and sequence recommended messages. The random forest model uses multiple tree structures to classify data elements, and then aggregates the classifications produced by the tree structures to reduce variance. The random forest algorithm may be used to predict whether an action is performed on a recommended message, given previous responses to that message.

The disclosed system may send recommendations to a computing device of a message publisher, which may be a mobile device. The publisher may send the recommendations to a medical rep The medical rep may send the recommended message to the HCP's computing device through an internet message or mobile communication method based on the recommendation. The recommendation may be a full message or a part of a message, such as a subject line or a line within a message body. The recommendation may not be part of a message, but may have temporal or contextual information associated with it. For example, the recommendation may inform the medical rep when to contact a doctor, or what method works best. The HCP engagement engine may produce one recommendation, or it may produce a rank-ordered list of recommendations. The HCP engagement engine may be invoked multiple times to contact multiple HCPs.

FIG. 1 shows a system for implementing a health care provider (HCP) engagement engine. The system includes a network, one or more client devices, and one or more servers.

The network may be a computer network such as a local area network (LAN), a wide area network (WAN), a wireless local area network (WLAN), a metropolitan area network (MAN), a storage area network (SAN), a campus area network (CAN), or a personal area network (PAN). The network may be a wired or wireless network, such as a Wi-Fi network. The network may include servers, routers, switches, and other network devices and services to facilitate transfer of data, including session data, control data, commands and other communication between the various parts of the system.

The client devices may be computing devices. For example, they may be mobile computing devices, such as cellular phones, smartphones, personal assistants, and tablet computers. They may also be laptop computers, terminals, or desktop computers. The client devices can permit information exchange between the stakeholders of the system, namely, the medical reps and the HCPs. One or more of the client devices may belong to a medical rep. Additional client devices may belong to one or more health care providers (HCP). These health care providers may be physicians, nurses, nurse practitioners, pharmacists, scientists, researchers, or technicians. Medical reps and HCPs may communicate with their client devices using methods of text-based online or networked communication such as email, instant messaging, internet chat protocols, message boards, or bulletin board systems (BBS). Messages may also include mobile text messages as well as messages from social media websites, mobile applications, telephone calls, in-person meetings, video conferencing, conferences or seminars, or events conducted at an HCP's work facility.

The medical rep client devices may transmit information to the servers, including actions taken by medical reps, for analysis. The medical rep client devices may receive recommendations, such as recommended messages or suggested methods to contact HCPs, from the servers, and present them to the medical reps. The medical reps may have software installed that provides a user interface (UI) for presenting such recommendations. The software may integrate with applications that enable networked communication, such as MICROSOFT® OUTLOOK, GOOGLE® HANGOUTS, APPLE® iCHAT, and FACEBOOK® MESSENGER. For example, the software may extend the chat applications to provide popup notifications or additional windows in which information is presented to the medical reps. The medical rep client devices may periodically retrieve recommended messages from the servers, or may retrieve messages when a medical rep requests a recommended message to be provided from the servers. The HCP client devices may also have networked communications programs installed on them, and may present messages recommended to the medical reps to the HCPs. Both the medical rep client devices and the HCP client devices may have software installed on them to log actions taken by the medical reps and the HCPs, and send records of these actions to the servers. The actions logged may be mouse clicks, keystrokes, or interactions with onscreen elements. The actions may be sent to the servers along with timestamps, in order for the servers to record them as time-binned data for machine learning analysis.

The servers may be physical servers or virtual servers. Physical servers may be deployed in a server farm environment. Virtual servers may exist in a cloud computing environment or a distributed computing environment. The servers may store data and perform data analysis. The servers may include one or more data storage systems. The data stores may contain message data, pharmaceutical representative (medical rep) data, and HCP data. The medical rep data may include drugs and treatments sold by the pharmaceutical representatives. The HCP data may include the specialties or practice areas of the HCPs, the hospitals or institutions to which they are affiliated, and the seniority levels of the HCPs. Medical rep and HCP data may also include demographic information, such as age, education, location, and ethnicity.

The servers may receive data from the client devices, including the medical rep client devices and the HCP client devices. The servers may communicate through the network with computer programs installed on the client devices, in order to request data from the client devices in order to perform machine learning analysis. For example, the servers may periodically make requests for action data. The servers may request data monthly, weekly, or daily. In some implementations, the client devices may be able to opt in or opt out of sharing particular data items or categories of data with the servers. The servers may have installed one or more computer programs to aggregate and organize the data. One of the computer programs may determine if data sampled from one or more of the client devices is deficient, and may request additional data from the client device.

Figure 2A:
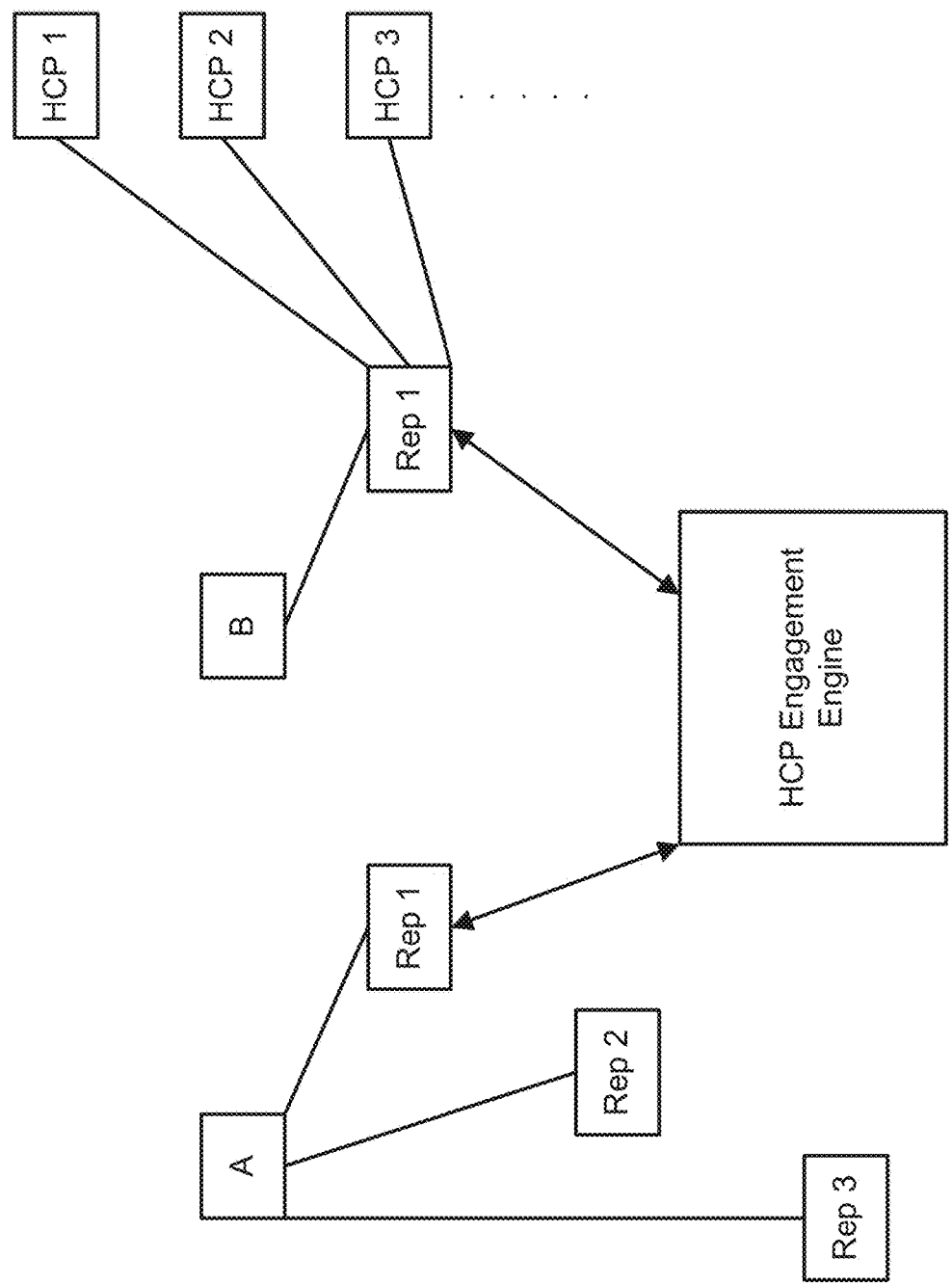
FIG. 2A shows a system by which messages can be delivered to pharmaceutical representatives in order to facilitate communication between pharmaceutical representatives and HCPs.

FIG. 2A shows an environment in which message recommendations are delivered to publishers in order to facilitate communication between medical reps and HCPs. FIG. 2A shows two companies, each employing one or more medical reps, whom in turn have relationships with one or more HCPs. In some cases, medical reps from different companies or from the same company may engage with a common HCP. For medical reps from different companies, this case may occur when reps sell competing products to the HCP. For medical reps from the same company, this may be the case when the medical reps sell different products to the HCP, in order to meet the HCP's diverse needs. For different medical reps, the engagement engine may produce different recommendations when the medical reps make requests for the messages. The recommendations generated by the HCP engagement engine may depend on characteristics of the medical reps as well as characteristics of the HCPs to whom the medical reps are selling products or services. When requesting one or more recommendations, a particular medical rep may provide the HCP engagement engine with an identifier, allowing the HCP engagement engine to perform analysis tailored for the particular medical rep. Alternatively, the HCP engagement engine may store or access identifiers corresponding to particular medical reps in a table or another data structure, and periodically supply medical reps listed in the table with recommendations. The HCP engagement engine may also store or access a table containing HCPs, in order to generate recommendations specific to both particular medical reps and particular HCPs.

The HCP engagement engine may recommend messages to the publisher to send to the medical reps for presentation to one or more HCPs. Medical reps may receive messages meant for one or more HCPs with whom they have relationships. In some embodiments, messages may be meant for many HCPs belonging to particular institutions. Messages with different recommendations may belong to a list of candidate messages, generated by using a machine learning algorithm to score and filter messages. Candidate messages are provided to pharmaceutical representatives with access to the servers. Particular candidate messages or lists of candidate messages may be selected based on the particular medical reps sending the messages and also may be based on the intended recipients of the messages. For example, message recommendations may be created by selecting features related to HCP actions performed on messages from particular medical reps or relating to particular products sold by the pharmaceutical representatives. Selected messages may also contain more generic language that is known already to arouse a particular HCP's attention. Recommendation messages from the HCP engagement engine may also take into account the company of the medical rep using the recommendation. For example, a company name may be stored with the identifier of the medical rep. The company name may be analyzed by one or more machine learning algorithms as a non time-binned feature, or be applied as a weight to recommendation candidates after machine learning analysis has completed.

Figure 2B:
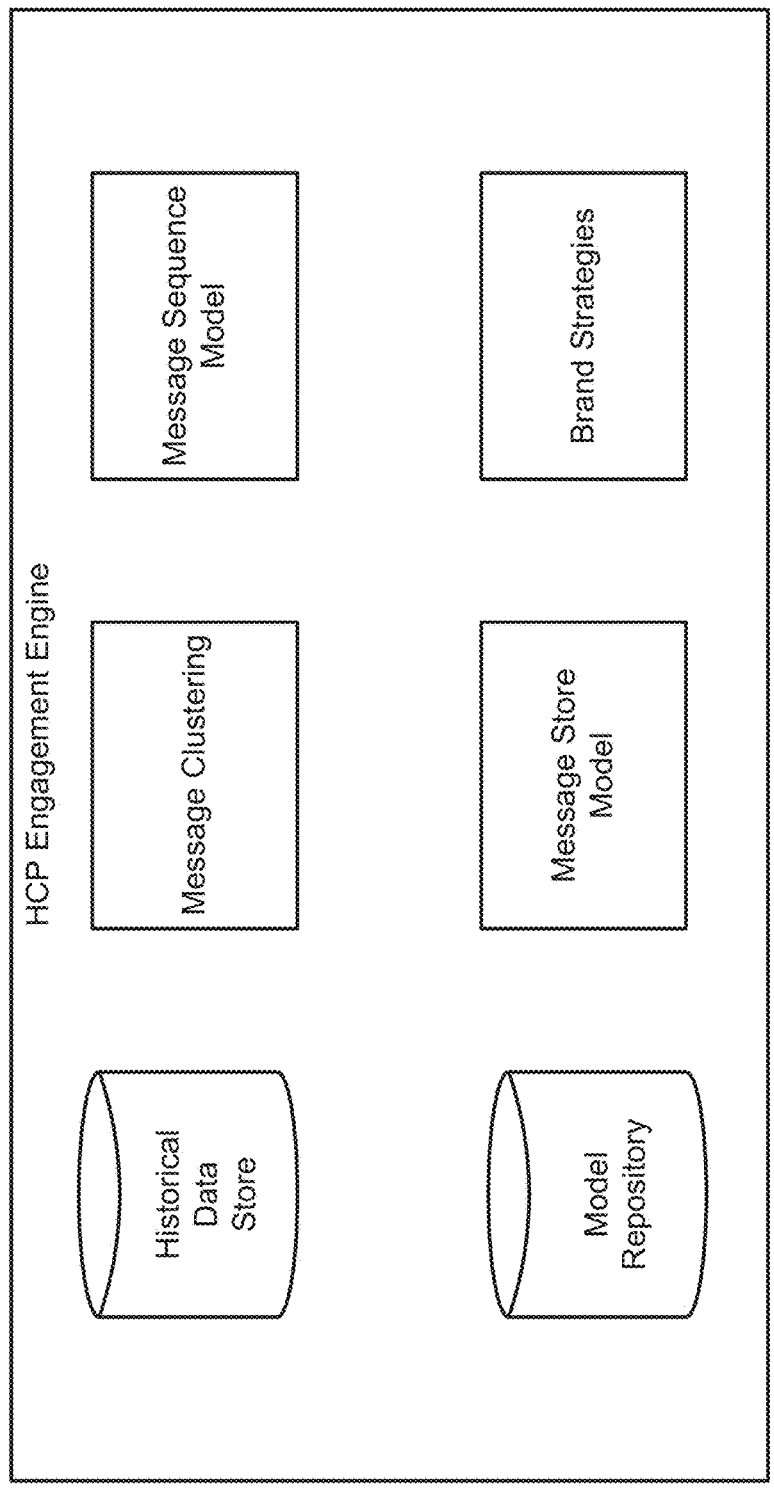
FIG. 2B shows a block diagram of the servers from FIG. 1.
Figure 3:
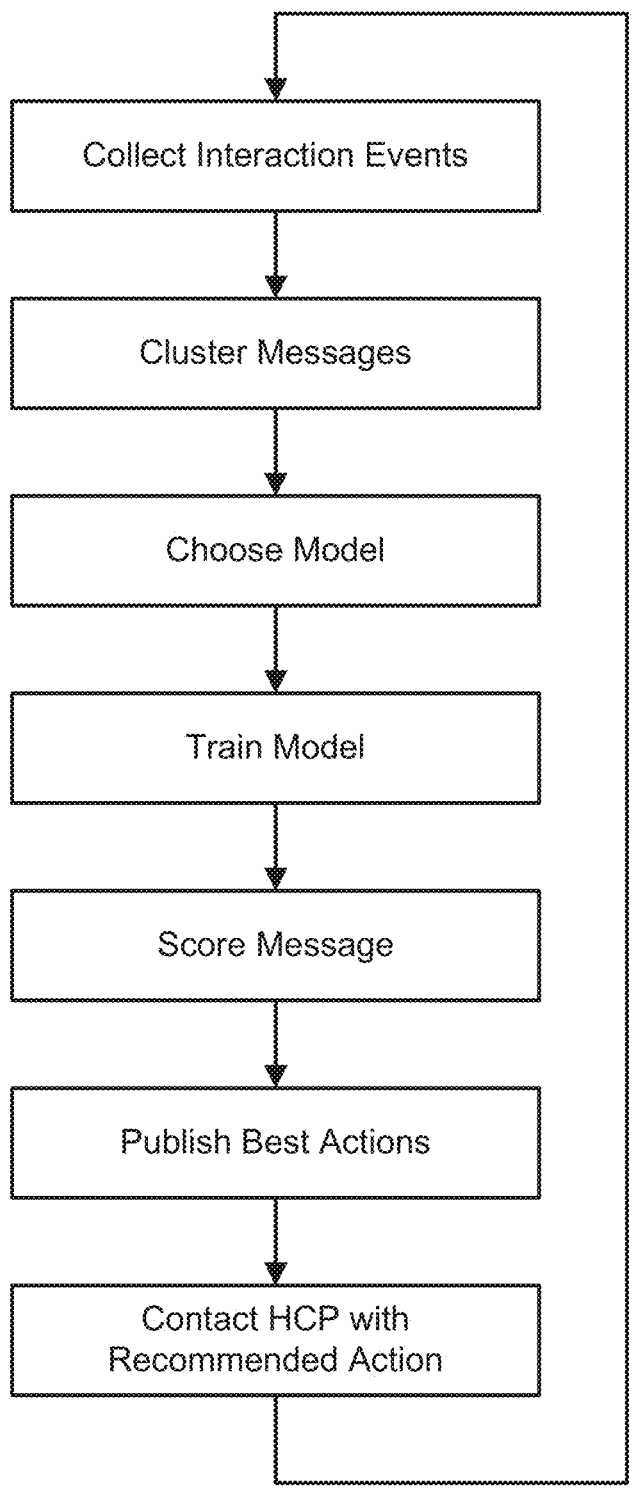
FIG. 3 illustrates a process flow for selecting candidate messages in accordance with some embodiments.

FIG. 2B shows a block diagram of the HCP engagement engine from FIG. 1. FIG. 3 shows a historical data store, a message clustering model, a message sequence model, a model repository, a message store model, and a brand strategies module. The modules within the servers are used by the system to produce one or more recommendations to a medical rep for messages to send to an HCP. The recommendations may have insights to increase a probability of effectively engaging or interacting with the HCP, in order to drive sales of a pharmaceutical product or service.

The historical data store stores time series actions of HCPs with messages sent by pharmaceutical representatives. The message delivery system may collect the actions from multiple time periods within a particular time interval, such as a year or six-month interval. The actions may date from a past hour, day, week, month, or year. The actions may be cumulative tabulations, such as "total number of clicks in the last six months", or they may be representative of actions taken within specific time windows, such as "messages opened in February." Time series data from the aggregated customer data may include timestamps associated with one or more of the following events or actions: (1) a time instant $t1$ at which the message is transmitted to the target customer's device(s); (2) a time instant $t2$ at which the message is received by the target customer's device(s); (3) a time duration $t3$ for which the message has yet to be opened by the target customer; (4) a time instant $t4$ at which the target customer opens the message; (5) a time duration $t5$ for which the message is being opened; (6) a time instant $t6$ at which the target customer clicks on content or a hyperlink within the message; (7) a time instant $t7$ at which the target customer closes the message; (8) a time instant $t8$ at which the target customer replies to the user's message; (9) a time duration $t9$ for which the target customer spends replying to the user's message; (10) a time instant $t10$ at which the target customer forwards the user's message to one or more other parties; (11) a time instant $t11$ at which the target customer archives the message; or (12) a time instant $t12$ at which the target customer deletes the message. The time periods associated with the time series data may be overlapping or non-overlapping time periods. There may be gaps in the time periods, or the time periods may be contiguous.

Actions may be events such as opening the message, replying to the message, ignoring the message, deleting the message, unsubscribing from messages sent by the user or blocking the user, archiving the message, sharing the message on social media or on an external webpage or platform, clicking on content or a hyperlink within the message, or forwarding to the message to one or more parties. The historical data store may also store actions that are not time binned, including total numbers of actions overall.

In some embodiments, the historical data store may collect actions from the medical rep as well as from the HCP. These actions may also be recorded during a particular time interval, and may also be time binned.

The historical data may be collected from customer relations management (CRM) systems, such as Salesforce and Veeva. The CRM systems may store demographic information or other characteristics about the medical reps and the HCPs, which may also be used as features for machine learning analysis. HCPs may be able to choose which data the CRMs are able to share with medical reps.

The message clustering model may cluster messages into groups in order to determine which messages may potentially be suitable for presentation to an HCP. The message clustering model may cluster messages by topic, such as solicitation messages, follow-up messages, and scheduling messages. The message clustering model may also cluster messages by product, such as by type of drug sold to the HCP. Messages may be clustered by title. The message clustering model may also cluster messages temporally, grouping messages that are suitable to be sent during specific temporal periods together.

Messages may be clustered using, for example, partition-based clustering methods, such as k-means or k-medoids clustering, partitioning around medoids (PAM), hierarchical clustering, density-based clustering, or probability-based clustering methods. Clustering may be done with respect to one or more features of the messages. For example, messages may be plotted based on their values with respect to two features, and groups may be formed of these messages using one of the clustering algorithms described.

The model repository contains one or more models used to create a suggested list of messages for presentation to an HCP. These models may be binary classification models, including tree-based models such as gradient boosted trees, random forest algorithms, rotational forest algorithms, and bagging algorithms. They may also include neural network-based classifying algorithms such as convolutional neural networks (CNNs) and recurrent neural networks (RNNs). Neural networks may be layered in order to form deep neural networks, with multiple cascaded CNNs and RNNs. They may also use fully connected or dense layers or softmax layers to produce outputs with correct dimensionality. The models may analyze data from the HCP actions as well as from the medical rep actions.

Machine learning models may be trained on a rolling basis. For example, monthly binned data from a prior 12 month analysis period may be used to make a prediction for a $13^{th}$ month. A medical rep may wish to find a probability that a message with particular characteristics will be opened by a particular HCP. If a similar message was sent and responded to in the $12^{th}$ month, the model may be trained by making a prediction for the similar message. The similar message's data is already available, so the model can be trained by "predicting" the response for the $12^{th}$ month message and measuring an error between the predicted response and the actual result. The machine learning algorithm may backpropagate this error over multiple iterations, until the predicted response and the actual result converge. This process adjusts the machine learning algorithm until it becomes an accurate predictor. The adjusted machine learning algorithm may then be used to make a prediction for the $13^{th}$ month.

Training may have to occur when a recommendation is generated for a particular HCP, because training weights may have to be adjusted. For example, message actions performed by the HCP for whom the message is meant may need to be weighted more heavily than message actions performed by other HCPs. This may be important when HCPs have different professions or affiliations. In addition, features used for training may need to be modified if training data for the HCP for whom the message is intended is deficient or corrupted.

The message sequence model may be used to determine a preferred message sequence to send to an HCP in order to prompt a desired action. The message sequence model may use a greedy algorithm in order to determine the preferred message sequence. For example, in a first operation, the message sequence model may choose a best message to send out of a group of messages. The message sequence model may choose this message based on statistical or machine learning analysis. In a next operation, the message sequence model will choose among the remaining messages, given the event that the first message has already been chosen. In a third step, the message sequence model may choose a third message given the event that the prior sequence of two messages has been chosen. This process may continue until all messages have been chosen. At each stage of the message sequence model, one or more machine learning algorithms may be used to select a message. For example, a random forest algorithm may be used to select the first message from the first operation. Following is a description of an implementation of the message sequence model. For example, a set of actions includes a message send, a message open, or a message click action.

$E_{a,i}(s,t)$ be the ith event for account a from times to time t $N_a(s,t)$ be the number of events for account a from time s to time t M be the set of all messages The actions may be ordered by time so that if the time when $E_{a,i}(s,t)$ occurs is earlier then the time when action $E_{a,j}(0,t)$ occurs then $i<j$.

$$E_a(s,t) = \{E_{a,i}(s,t) | 0 \le i \le N_a(s,t)\}$$

The above equation means an ordered set of all actions for the account from time s to time t.

The message sequence model may be used to predict a probability for a particular action type to occur based on the history of actions from the historical data store. The model may, for example, attempt to predict a message open action for message m* for an arbitrary HCP conditioned on collected historical actions. The message open for m* is a target action. An example action sequence my be {send m, send n, open m, send n, send m*, open n . . . }, Then an observation of $E_a(0,t)$ may be denoted as:

$E_a(0, t)$={send m, send n, open m, send n, send m*, open n}

The model may try to predict the following probability for message action open m*.

$$\Pr(\text{open } m^* \in E_a(0,T) | E_a(0,t) \text{ for } T>t)$$

The model may estimate this probability for each message in M and for today t. To estimate this probability, the model may build a design matrix for each message m in M The design matrix may capture the events that preceded the target action or all the events if there was a send of the target message and no target action. It also may include any additional demographic and segmentation variables that characterize the target HCP. To make a prediction, the message sequence model uses a target vector, which is a sequence of binary values representing a sequence of events that have occurred. In this implementation, the target vector is a sequence of binary values depending on whether the target message m* is opened (or clicked).

The message sequence model may use a machine learning algorithm, such as a random forest algorithm to map the relationship between the design matrix and the target vector. The message sequence model may improve over time, since it receives new data daily. The model may be retrained periodically, such as daily, weekly, or yearly, to reflect the additional data.

In particular, random forest models may be used to generate the conditional probabilities of the message open events from the information in the design matrices from the message open events. The message sequence model may fit a separate random forest model for each message, given past observed data, and use an ordered progression of models to generate the optimal sequence of messages to send. At each stage, the conditional probability of a message being opened, given the previous message being sent, is calculated by modifying the data set (or intervening) to account for the previous message send before performing the random forest. In addition to a random forest model, the message sequence model may be a mean-square error model or a simple regression model.

The brand strategies module may collect strategies for companies that wish to market drugs or treatments. These strategies represent features that are not time binned, and can be used for analysis in conjunction with the time binned features. The brand strategies module may contain messages that are approved by the companies marketing the drugs or treatments sold by the medical reps. The recommended messages may be compared to these brand approved messages. In some embodiments, recommended messages may receive higher weight if they are similar to messages approved by the companies the medical reps belong to. Companies may also use similarities between their messages and the recommended messages to assess their marketing strategies and tailor the solicitation messages they approve to send to HCPs in order to make the messages more effective.

The decision support model may use one or more of the brand strategies module, the message sequence model, and the model selected from the model repository to determine one or more recommendations to present to the medical rep. The one or more recommendations are configured to maximize a likelihood of the HCP clicking or opening an existing message or a next message from the medical rep. The decision support model may also incorporate analysis, for example, machine learning analysis, of similar HCP actions in order to determine the one or more recommendations. Further, the decision support model may also incorporate analysis of actions from similar medical reps in order to determine the one or more recommendations. The decision support model may record results of actions performed by the HCP when the medical rep implements one of the recommendations, and use the recorded results for future analysis. For example, the decision support model may store the HCP actions from an implemented recommendation in the message store, and the system may use the HCP actions to produce future recommendations. This may be done by training one of the machine learning algorithms used for models in the model repository.

FIG. 3 illustrates a process flow for selecting messages to be recommended. In general, the message delivery system collects data from one or more target HCP devices, such as mobile phones, desktop or laptop computing devices, pagers, and tablet computers. The data may include information about actions taken by the target HCP in response to messages sent by one or more pharmaceutical sales reps. For example, actions may include responding, opening, deleting, clicking a hyperlink inside, or simply ignoring a received message. The message may be regarding selling a pharmaceutical product, such as a drug or treatment, or may be a related message, such as a follow-up message.

The method may aggregate the response data from the HCP devices over a period of time. For example, the method may aggregate a year's worth of data. The data may be time binned. For example, data from February may be labeled as such. Data may also be labeled according to how far in the past it was captured, such as "messages received last week." The system may use one or more machine learning algorithms to analyze the data and to generate recommendations to the medical rep. These recommendations may advise the rep regarding how best to target the HCP with messages in the future, or may provide sample message or sample text to insert in a message.

The messages may contain temporal or contextual insights, in order to increase a probability that the target HCP will respond in a method preferred by the medical rep. A temporal insight may be suggesting a time or time period for the medical rep to deliver a follow-on message to the target HCP at a specific time or time window, or during a particular day of the week or month. In order to do this, a recommendation may prompt the pharmaceutical rep to contact an HCP by email after 4:00 PM or after the HCP has finished three patient appointments. A contextual insight may be a suggested follow-on message to deliver to the HCP, with particular keywords, topics, or phrases that may be relevant to the HCP's interests, and thus spur the HCP to open the message, respond to the message, or purchase a pharmaceutical product or service. Topics, subjects or keywords are determined to be of interest or relevance to the target customer based on one or more of the following: (1) a profile of the target HCP; (2) information about the target HCP obtained directly or indirectly from one or more sources; (3) information about one or more conferences or events that the target HCP has attended, is attending, or planning to attend; (4) articles written or published by the target HCP; (5) talks or presentations given by the target HCP; (6) online content posted by the target HCP; (7) news, reviews, or articles about the target HCP posted by third parties or individuals affiliated with the target HCP; or (8) other pharmaceutical products that are currently being used or endorsed, or that had been previously used or endorsed by the target HCP. Further, contextual insights may include information about special offers, or information suggesting a success rate for an advertised drug or treatment. Sending messages with these insights may cause the target HCP to open more messages, respond to messages in a timely manner, or agree to purchase pharmaceutical products more frequently.

In a first operation, information about historical actions is collected using the historical data store of FIG. 2B. In a second operation, messages are clustered based on the ultimate intent of the medical rep sending the message. In a third operation, a model is chosen in order to select the messages. The model may be chosen based on the historical action data available, as well as based on whether additional features, such as brand strategy features, are available for use in analysis. In a fourth operation, the chosen model is trained. The model may be trained over a set number of epochs (e.g., 10 epochs) or until a convergence condition is met (e.g., minimization of a loss function to be less than a chosen threshold). After the model is trained, it is tested on the time series data and used to score candidate messages. The highest-scoring messages may then be rank ordered and presented as recommendations to the pharmaceutical representative, who may then choose among them to send to the HCP.

Recommendations may be reused or discarded after they are implemented. For example, a medical rep may send a recommendation message to a doctor. If the message is effective, it may be given a higher score or weight when analyzed by the machine learning algorithm. This recommendation may be stored in the message store after it is implemented, and become another candidate message for a future solicitation event. The effective recommendation message may be modified during this future event to reflect a change in the solicited product or service. An ineffective message may have its score reduced, either manually or during training of the machine learning algorithm. Ineffective messages may also be discarded, either by one or more of the models or by the medical rep.

Figure 4:
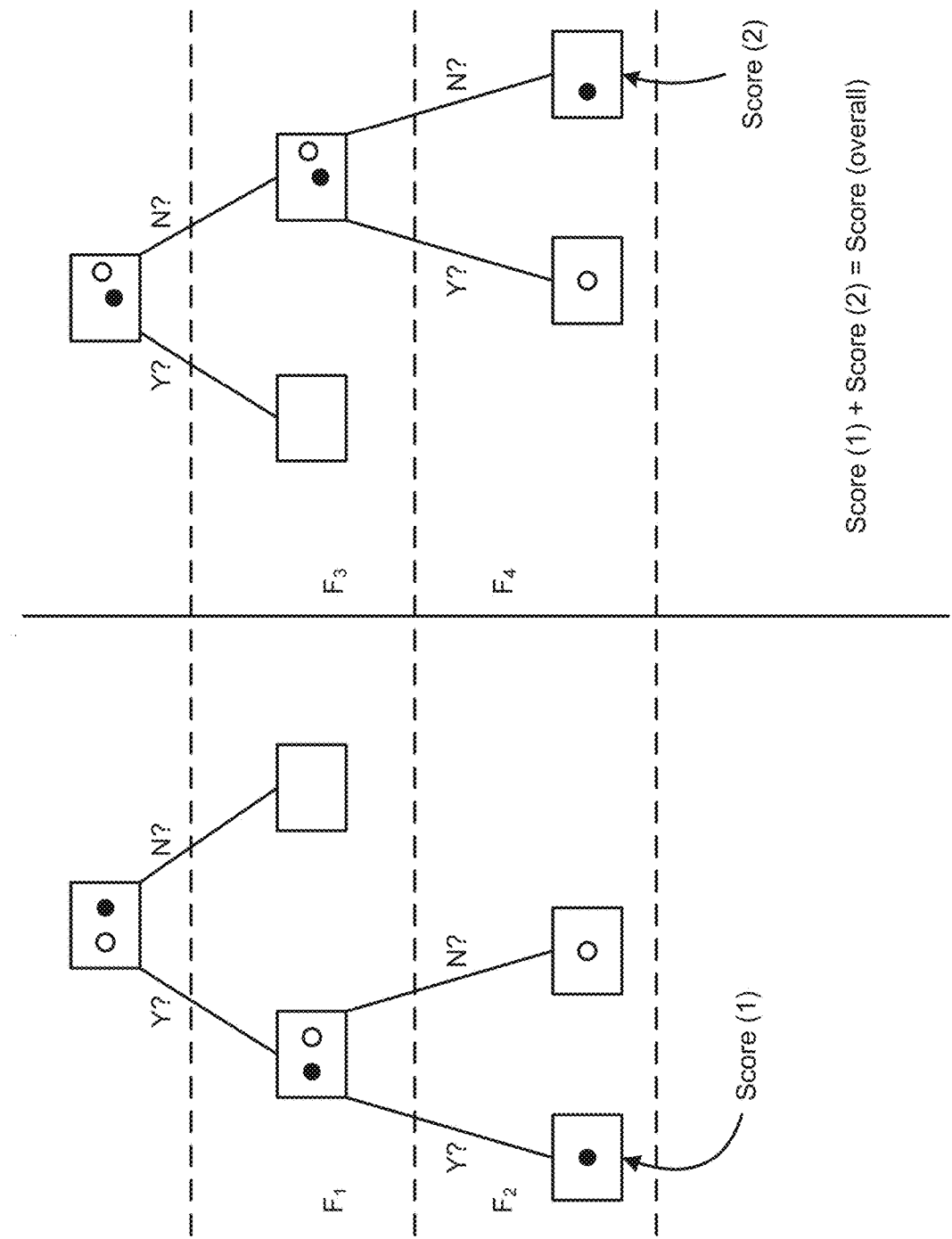
FIG. 4 shows a random forest algorithm that can be implemented in the health care provider engagement engine described herein.

FIG. 4 shows a random forest algorithm. Random forests are an ensemble learning method for classification, regression and other tasks that operates by constructing a multitude of decision trees at training time and outputting the class that is the mode of the classes (classification) or mean prediction (regression) of the individual trees. Random decision forests correct for decision trees' habit of overfitting to their training set.

Using a single tree to classify a large data set is often not desirable. Decision trees classify elements within a data set by iteratively partitioning the data set with respect to individual characteristics of the elements of the data set. These characteristics are called features. In order to properly classify data elements, partitions may need to only contain a few elements each. In a decision tree, a partition is made by comparing elements using a threshold for a feature. For example, a population may be split into two groups, with one group having brown eyes and the other group not having brown eyes. This split may be visualized as a branch, with the elements at the bottom of each branch visualized as leaves or nodes. For large data sets, many partitions need to be made. When training a decision tree, creating too many partitions may result in a low-bias, but high-variance, data set. Thus, creating too many partitions using a single deep decision tree may result in overfitting.

In order to avoid overfitting when classifying data using decision trees, several machine learning algorithms have been developed. One of these methods is the random forest method. The random forest method creates many trees and averages them, reducing the variance and boosting performance. For each created tree, a random forest algorithm selects a random subset of features. This process is called bootstrap aggregating, or bagging. The number of trees to be created may be set by a developer, and may be in the hundreds. An individual decision tree may be grown to a particular length, or number of branching decisions. For example, the number of features used may be set by a developer. Alternatively, the length of the tree may be determined based on a convergence condition, such as a minimization of a loss function. Once all of the trees have been implemented, the classification results from the trees are aggregated. For example, each classification group (node or leaf) at the bottom of each tree may be given a score, and these scores may be added together to produce a total classification score for each classification group. All of the elements in each group have the same score. These scores may be mapped to qualitative values. In the preceding example, the random forest method may give all of the subjects with brown eyes scores greater than 0.5, and all the subjects without brown eyes scores less than 0.5.

FIG. 4 shows a simple example of a random forest with two decision trees. Each decision tree has two splits, based on a different "random" set of two features. The left tree splits on features 1 and 2, while the right tree splits on features 3 and 4. Each tree analyzes a set of elements, which includes the feature of interest, designated by a black, filled-in circle. Although each tree analyzes the same number of elements, the remaining elements, designated by unfilled, white circles, are not necessarily the same. This is because, in this implementation, each tree randomly selects a fixed-size subset of elements for analysis. Each level of the tree corresponds to a binary decision. In FIG. 4, the decision is a yes or no decision. At each level of the tree, elements are classified on the basis of the binary decision with respect to the feature at each level. The terminal nodes, or leaves, represent the final classifications of the elements. Based on these classifications, the elements are given scores. On the left tree, the black, filled-in circle is given score(1). On the right tree, the black, filled-in circle is given score(2). These scores are added to produce an overall score for the black, filled-in circle element. The white, unfilled circles also receive scores, although they are not shown in the figure.

Although random forest algorithms are described here, other methods that aggregate scores from decision trees in order to classify data elements may also be used. These methods include gradient boosted trees, other types of bagged trees, rotation forests, and decision lists.

Figure 5A:
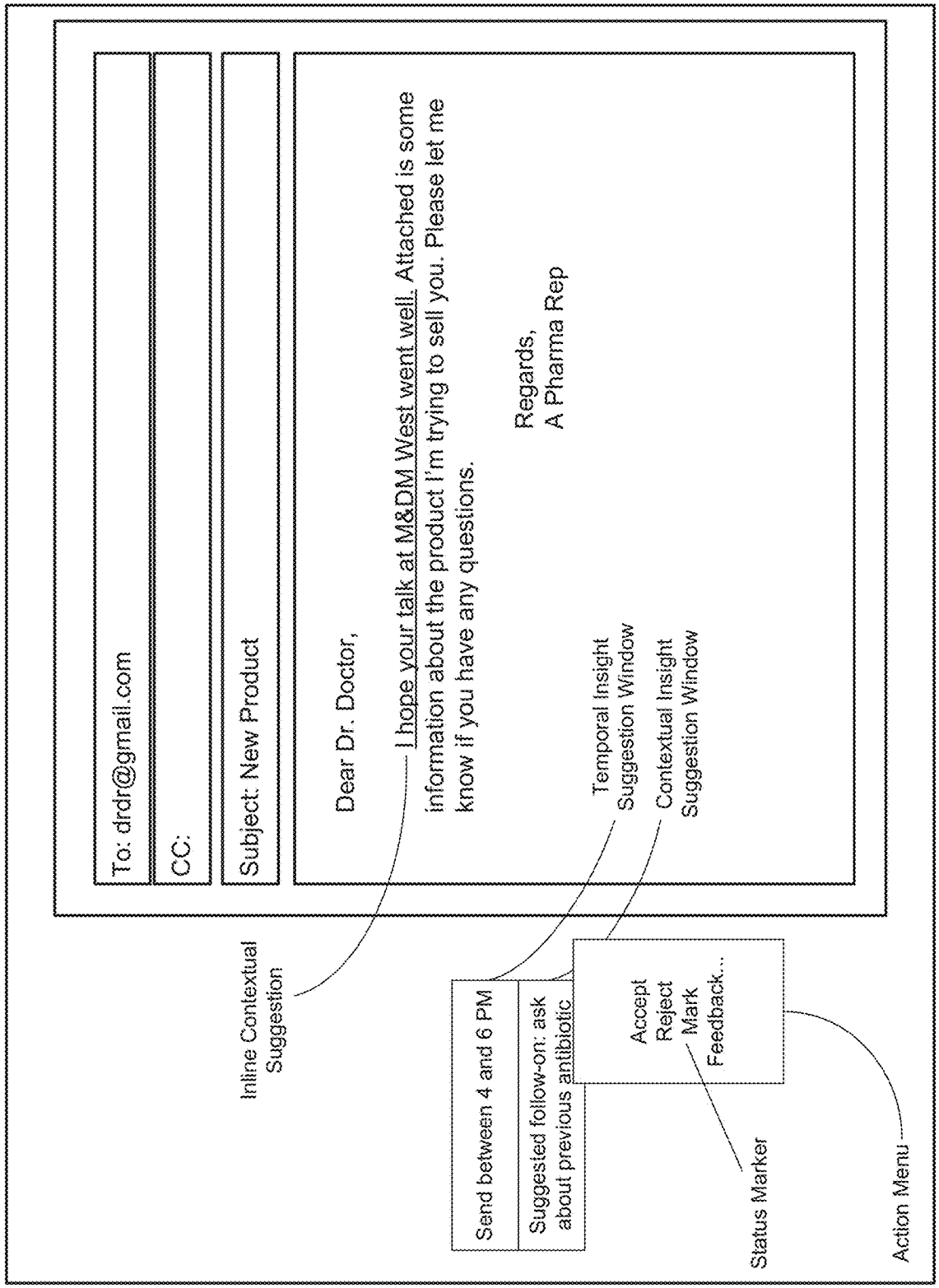
FIG. 5A shows an illustrative example of a recommended message to be sent from a medical rep to an HCP.

FIG. 5A shows an illustrative example of a recommended message to be sent from a medical rep to an HCP. The message contains one or more recommendations displayed as visual graphical objects, which may be embedded within the email text or be relayed to the medical rep in an external message.

In the embodiment of FIG. 5A, the messages are displayed in an email client. Examples of email clients used include GOOGLE® GMAIL and MICROSOFT® OUTLOOK. The messages may also belong to a chat program or may be short message service (SMS) messages. The HCP engagement engine may be able to interface with these message delivery programs, for example, by using an application programming interface (API). The HCP engagement engine may be able to provide the email client or message delivery program with visual objects, such as buttons, menus, or overlays, to display recommendations. The HCP engagement engine may be able to populate text boxes, such as fields for subjects or body text, with pre-written text from message recommendations. The HCP engagement engine may also be able to overlay one or more message suggestions, which may be determined from temporal or contextual insights, and which are not populated in text boxes but intended for the medical rep to take into account when drafting messages for HCPs. A suggestion determined from a temporal insight may include specifying a time to send the message. The temporal suggestion may also include a time window, such as "afternoon" or "between 12 and 5 PM". The temporal suggestion may contain a day suggestion, such as "Sunday" or a date suggestion, such as "on or after the 25$^{th}$." A temporal suggestion may also include waiting a specified amount of time, such as a day or two weeks, before sending a follow-up message to an HCP.

FIG. 5A shows an illustration of recommendations presented to a medical rep, overlaid on the medical rep's email client. The medical rep has opened a message window, containing address fields, a subject field, and a message body field. Within the message body field is a message body with suggested and non-suggested text. The inline contextual suggestion, shown as underlined text, was generated by the recommendation engine and inserted as the first line in the message body. The generated recommendation may be placed by the medical rep elsewhere in the body of the message. In addition, the HCP engagement engine may generate a recommendation informing the medical rep of an optimal place within the message body to place generated inline text suggestions. The HCP engagement engine may also recommend text comprising an entire message body, and may also generate a recommended subject line.

The overlaid recommendations are displayed as visual graphical objects. The HCP engagement engine also may display additional visual graphical objects, in order to allow the medical rep to interact with the generated suggestions. The one or more visual graphical objects may be configured to allow the medical rep to perform one or more of the following actions: (1) accept the one or more recommendations; (2) reject the one or more recommendations; (3) mark the one or more recommendations with a status marker; or (4) provide feedback on the one or more recommendations. The status marker may comprise a to-do action or a completed action.

External to the message body, FIG. 5A displays recommendations with temporal insights and contextual insights. These recommendations are displayed as text fields which may be manipulated by the medical rep. In other embodiments, the recommendations may be displayed elsewhere on the page, or may be displayed in a program running outside of the email client. The recommendations may be displayed in a separate toolbar, command window, or menu. In the embodiment of FIG. 5, the recommendations may be accepted, rejected, marked, or be given feedback by right-clicking. The temporal recommendation may specify a time to send the message. The temporal suggestion may also include a time window, such as "afternoon" or "between 12 and 5 PM". The temporal suggestion may contain a day suggestion, such as "Sunday" or a date suggestion, such as "on or after the 25$^{th}$." The contextual recommendation suggests a topic for the medical rep to follow up with the HCP regarding.

The medical rep may be able to cycle among one or more recommendation candidates, depending on an intuition the medical rep may have developed regarding which candidate may be most effective. Alternatively, the medical rep may combine one or more recommendations for use in a text body.

FIG. 5B shows an illustration of an HCP's email client. In the illustration of FIG. 5B, the HCP receives the message from the embodiment of FIG. 5A. The HCP has decided to open the message. The message open action performed by the HCP may be logged by the HCP engagement engine. The logging may be performed by an HCP engagement client installed on the HCP's client device, which reports data back to the HCP engagement engine. Alternatively, the medical rep may request a read receipt from the HCP. When the medical rep has received the receipt from the HCP, the engagement engine may be notified that the HCP has opened the email communication.

Figure 5C:
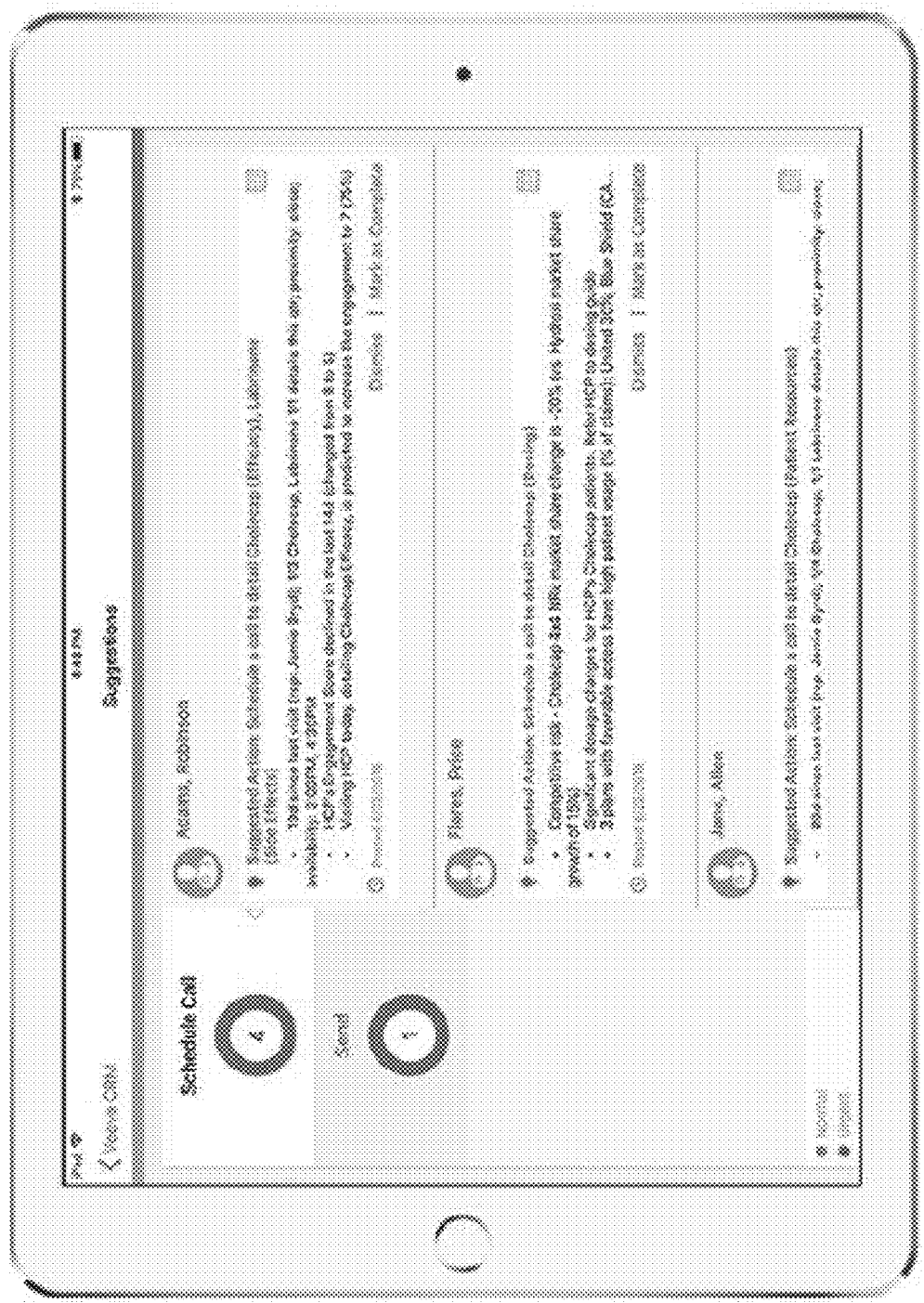
FIG. 5C shows an alternate embodiment for a user interface providing recommendations to medical reps

FIG. 5C shows an alternate embodiment for a user interface providing recommendations to medical reps. This embodiment includes options for scheduling calls with HCPs and also sending text communications to HCPs. FIG. 5C shows different sets of recommendations for a plurality of HCPs. For each HCP, the user interface suggests an action, such as scheduling a call. The UI then prints a list of information detailing prior correspondence between the rep and the HCP. For example, the UI informs the medical rep of the time interval since the medical rep's last contact with the HCP. The UI may also show statistics reflecting engagement with the medical rep, such as an engagement score describing the degree to which interactions between medical reps and the HCP are successful. The UI may also show the medical reps information about what kinds of medications or treatments the HCPs describe, indicating whether the HCP may be receptive to the medical rep's product. The UI may also show information about how competitor drugs and treatments are faring in the market in order to give the medical rep more information about how to market his or her drugs. The medical reps may also be able to dismiss or mark as complete suggestions from this embodiment.

Figure 6:
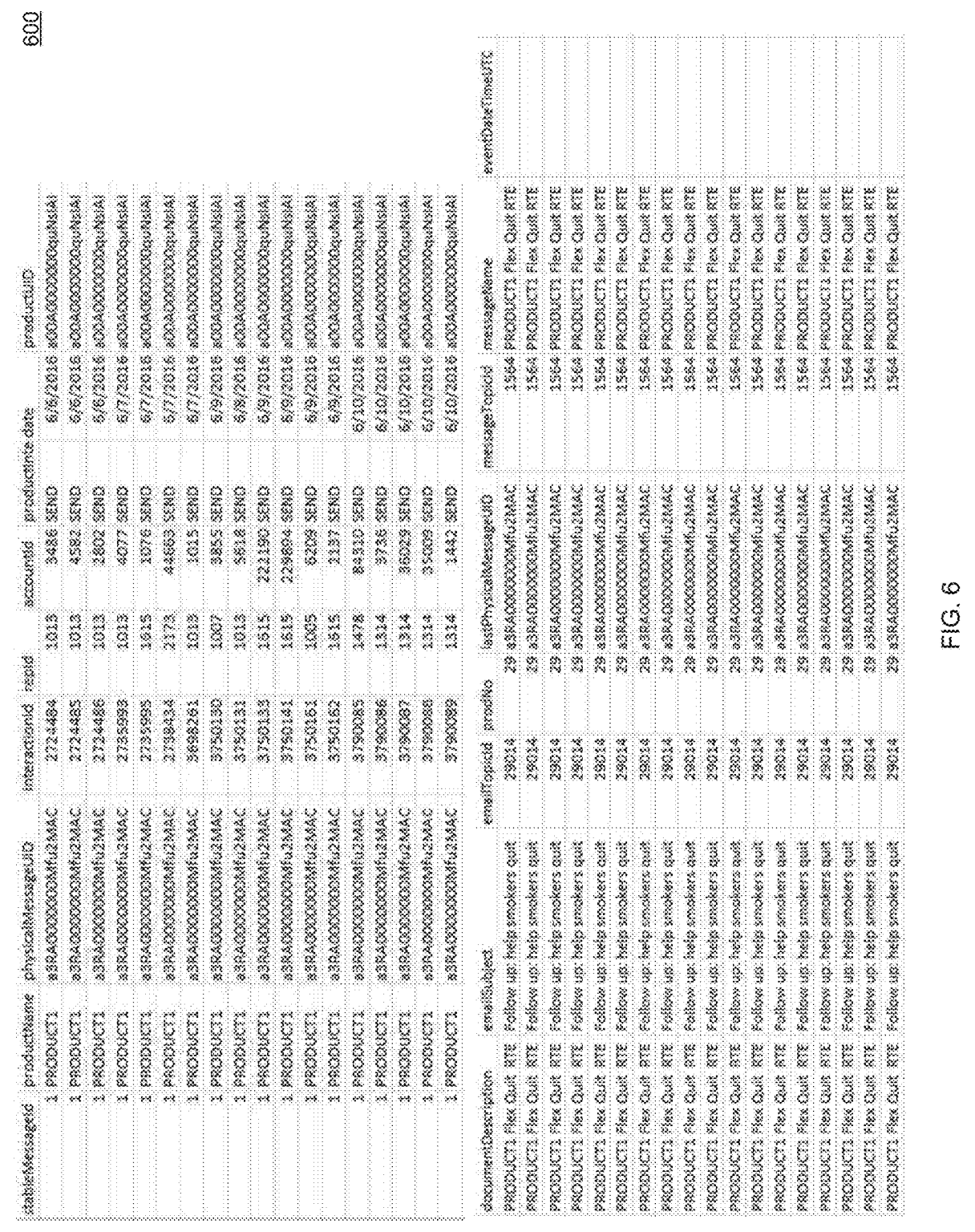

FIG. 6 shows sample input data 600 processed by the system. The set of inputs shown in FIG. 6 should not be construed as to be a limiting set of inputs. More or fewer inputs may be used, and analyzed by the one or more machine learning algorithms of the system. FIG. 6 includes inputs with labels stableMessageID, productName, physicalMessageID, interactionID, repID, accountID, productName, physicalMessageUID, interactionID, repID, accountID, productInteractionTypeName, date, productUID, documentDescription, emailSubject, emailTopicID, prodNo, lastPhysicalMessageUID, messageTopicID, messageName, and eventDateTimeUTC.

In the embodiment of FIG. 6, the inputs are for a set of identical messages advertising a particular product (in this example, PRODUCT1), from a plurality of medical reps to a plurality of accounts, or HCPs. The HCPs, in this example, are all sent the same message, at different times. The previous messages sent to the HCPs are also included as inputs. The messages advertise a product that is advertised to help smokers quit smoking.

In order to train the machine learning algorithms, the system may use a set of input features, but with associated ground truths showing the actions of the HCPs to which these messages were sent. The ground truths may be binary variables, or scores. For example, a ground truth output of 1 may indicate an HCP has opened a message, where a ground truth output of 0 may indicate an HCP has not opened a message. A particular score or range of scores may be correlated with specific actions by HCPs. For example, if scores range from 1 to 5, a score between 0 and 1 may represent no action by an HCP, a score between 2 and 3 may indicate a read message, and a score between 4 and 5 may indicate a replied-to message.

FIG. 7 shows sample output recommendation data 700 from the system. FIG. 7 shows a list of message recommendations. The messages are scored, with the highest-scored messages predicted to be most likely to generate a desired action from the target HCP.

In the embodiment of FIG. 7, the data includes an accountId, a messageAlgorithmId, a messageId, a modelId, and a probability. The data show message response predictions for four messages (with identifiers 1598, 1639, 1806, and 1812) to HCPs with account identifiers 1002, 1003, 1006, 1007, 1009, and 1010. The predictions were performed using machine learning algorithm 44 (under messageAlgorithmId), which is a random forest algorithm. The modelID parameter refers to parameters chosen by a user for analysis, including a target action (such as a click or message open), and a particular product. For each account, a set of probabilities are shown, which correspond to each of the four messages. The highest probability indicates the message ID that has the greatest chance of being opened by an HCP.

Figure 8:
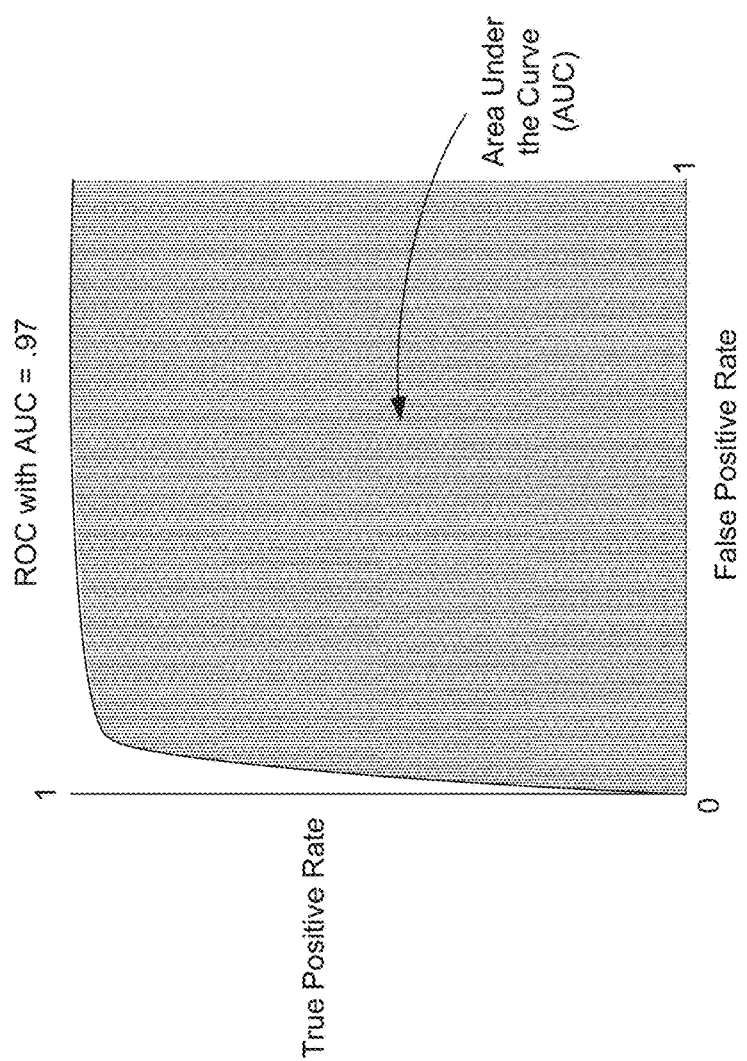
FIG. 8 shows an evaluation of the machine learning algorithm used to generate the recommendation messages.

FIG. 8 shows an evaluation of the machine learning algorithm used to generate the recommendation messages. The evaluation includes a receiver operating characteristic, which measures, as a binary classification threshold is varied, the effectiveness of the machine learning system to recommend a message that generates an intended response from an HCP. The effectiveness may be measured by measuring the area under the ROC curve (AUC). AUC values may range from 0 to 1, with values closer to 1 indicating a more effective ability to predict whether a message will result in a particular response from an HCP, as the threshold is varied. The threshold determines whether a prediction made by the machine learning algorithm may be interpreted as a minimum score for a message to be a recommendation candidate for delivery by a publisher to an HCP.

FIG. 8 shows outputs of the evaluation. The target category reflects a particular action to be performed on a particular message. For example, the target in row 2 is an open event for message a3RA . . . Mfu2MAC, while the target in row 3 is an open event for message a3RA . . . e0taMAA. For both of these targets, the AUCs are 0.97 and 0.96, indicating an effective machine learning model. The models have accuracy of 0.98 and 0.936, indicating a high rate of correctly predicting effective recommendations. The precisions, of 0.97 and 0.68 indicate that 97% of positive values predicted by the first iteration were correct, and 68% of positive values predicted by the second interaction were correct (e.g., true positives instead of false positives). The misclassification rates show the percentages of false positives and false negatives with respect to prediction of effective messages. The prevalence shows the percentages of effective recommendations.

Also pictured in FIG. 8 is an ROC with an AUC=0.97. The ROC curve shows a rounded "corner", indicating a high classification accuracy, even at large thresholds. Even at thresholds close to 1.0, there is a large relative frequency of true positive values and a small relative frequency of false positive values (e.g., the true positive rate (TPR) is high and the false positive rate (FPR) is low).

Computer Systems

Figure 9:
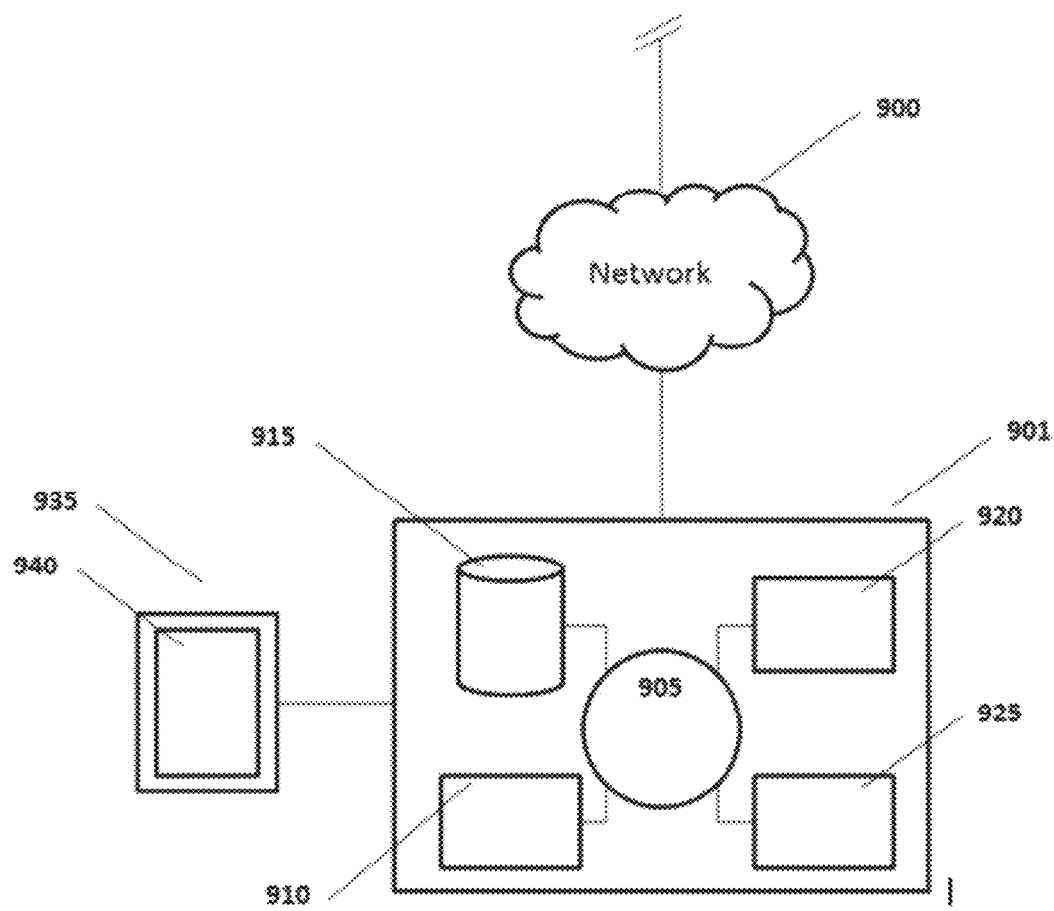
FIG. 9 shows a computer system that is programmed or otherwise configured to perform data sharing and analysis tasks.

The present disclosure provides computer systems that are programmed to implement methods of the disclosure. FIG. 9 shows a computer system 901 that is programmed or otherwise configured to perform data sharing and analysis tasks. The computer system 901 can regulate various aspects of the present disclosure, such as, for example, storing actions from HCPs and medical reps, storing message candidates, and performing machine learning analysis. The computer system 901 can be an electronic device of a user or a computer system that is remotely located with respect to the electronic device. The electronic device can be a mobile electronic device.

The computer system 901 includes a central processing unit (CPU, also "processor" and "computer processor" herein) 905, which can be a single core or multi core processor, or a plurality of processors for parallel processing. The computer system 901 also includes memory or memory location 910 (e.g., random-access memory, read-only memory, flash memory), electronic storage unit 915 (e.g., hard disk), communication interface 920 (e.g., network adapter) for communicating with one or more other systems, and peripheral devices 925, such as cache, other memory, data storage or electronic display adapters. The memory 910, storage unit 915, interface 920 and peripheral devices 925 are in communication with the CPU 905 through a communication bus (solid lines), such as a motherboard. The storage unit 915 can be a data storage unit (or data repository) for storing data. The computer system 901 can be operatively coupled to a computer network ("network") 930 with the aid of the communication interface 920. The network 930 can be the Internet, an internet or extranet, or an intranet or extranet that is in communication with the Internet. The network 930 in some cases is a telecommunication or data network. The network 930 can include one or more computer servers, which can enable distributed computing, such as cloud computing. The network 930, in some cases with the aid of the computer system 901, can implement a peer-to-peer network, which may enable devices coupled to the computer system 601 to behave as a client or a server.

The CPU 905 can execute a sequence of machine-readable instructions, which can be embodied in a program or software. The instructions may be stored in a memory location, such as the memory 910. The instructions can be directed to the CPU 905, which can subsequently program or otherwise configure the CPU 905 to implement methods of the present disclosure. Examples of operations performed by the CPU 905 can include fetch, decode, execute, and writeback.

The CPU 905 can be part of a circuit, such as an integrated circuit. One or more other components of the system 901 can be included in the circuit. In some cases, the circuit is an application specific integrated circuit (ASIC).

The storage unit 915 can store files, such as drivers, libraries and saved programs. The storage unit 915 can store user data, e.g., user preferences and user programs. The computer system 901 in some cases can include one or more additional data storage units that are external to the computer system 901, such as located on a remote server that is in communication with the computer system 901 through an intranet or the Internet.

The computer system 901 can communicate with one or more remote computer systems through the network 930. For instance, the computer system 901 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 901 via the network 930.

Methods as described herein can be implemented by way of machine (e.g., computer processor) executable code stored on an electronic storage location of the computer system 901, such as, for example, on the memory 910 or electronic storage unit 915. The machine executable or machine readable code can be provided in the form of software. During use, the code can be executed by the processor 905. In some cases, the code can be retrieved from the storage unit 915 and stored on the memory 910 for ready access by the processor 605. In some situations, the electronic storage unit 915 can be precluded, and machine-executable instructions are stored on memory 910.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 601, can be embodied in programming. Various aspects of the technology may be thought of as "products" or "articles of manufacture" typically in the form of machine (or processor) executable code or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

The computer system 901 can include or be in communication with an electronic display 935 that comprises a user interface (UI) 940 for providing, for example, a plurality of cross-sections of a 3D object. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 905. The algorithm can, for example, be a machine learning algorithm used to generate a message recommendation.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A computer-implemented method for eliciting a target interaction with a user interface, the method comprising:
   (a) receiving, using one or more processors, event data, segmentation data, and demographic data from a computer storage module, wherein the event data comprises a plurality of previous interactions with a plurality of previous electronic messages by a plurality of healthcare providers (HCPs), wherein the segmentation data comprises a category of each HCP by scientist, researcher, technician, physician, nurse, nurse practitioner, or pharmacist, and wherein the demographic data comprises a profile of each HCP by location, age, education, location, or ethnicity;
   (b) determining, using the one or more processors, a likelihood of a next set of electronic messages being opened by each HCP in (1) a specific category of the segmentation data and (2) a specific location of the demographic data, wherein the determining comprises:
      (i) processing the event data into a target vector, wherein the target vector comprises an output variable for each interaction of the plurality of previous interactions,
      (ii) processing the segmentation data and the demographic data into a design matrix, wherein the design matrix comprises (1) an input variable for each data of the segmentation data and (2) an input variable for each data of the demographic data,
      (iii) executing a trained machine learning (ML) algorithm to fit a fitting function between the target vector and the design matrix,
      (iv) using the fitting function to determine at least an engagement score for each message of the next set of electronic messages, wherein the determining comprises calculating a conditional probability for each message being opened by each HCP based at least on the specific category of the segmentation data and the specific location of the demographic data, and
      (v) determining a message sequence of the next set of electronic messages, wherein the determining comprises ordering the message sequence by the determined engagement scores that satisfy a threshold amount;
   (c) determining, using the one or more processors, to publish a next message of the message sequence for display on the user interface based at least on satisfying the threshold amount for a specific HCP in the specific category of the segmentation data and the specific location of the demographic data;
   (d) sending, using the one or more processors, the next message to the specific HCP in response to determining to publish the next message on the user interface;
   (e) after sending the next message to the specific HCP, determining, using the one or more processors, to terminate sending another message of the message sequence to the specific HCP based at least on (i) eliciting the target interaction or (ii) not satisfying the threshold amount; and
   (f) terminating sending another message of the message sequence to the specific HCP in response to determining to terminate sending another message.

2. The method of claim 1, wherein the target interaction comprises: (a) opening an electronic message, (b) clicking on content or a hyperlink within the electronic message, (c) replying to the electronic message, (d) forwarding the electronic message to one or more other parties, (e) deleting the electronic message, (f) archiving the electronic message, (g) posting or sharing the electronic message on social media or a website, or (h) inaction or lack of action taken with respect to the electronic message.

3. The method of claim 1, wherein the output variable of the target vector comprises: (1) a time instant $t1$ at which an electronic message is transmitted to a HCP; (2) a time instant $t2$ at which the electronic message is received by the HCP; (3) a time duration $t3$ for which the electronic message has yet to be opened by the HCP; (4) a time instant $t4$ at which the HCP opens the electronic message; (5) a time duration $t5$ for which the electronic message is being opened; (6) a time instant $t6$ at which the HCP clicks on content or a hyperlink within the electronic message; (7) a time instant $t7$ at which the HCP closes the electronic message; (8) a time instant $t8$ at which the HCP replies to the electronic message; (9) a time duration $t9$ for which the HCP spends replying to the electronic message; (10) a time instant $t10$ at which the HCP forwards the electronic message to one or more other parties; (11) a time instant $t11$ at which the HCP archives the electronic message; or (12) a time instant $t12$ at which the HCP deletes the electronic message.

4. The method of claim 1, wherein the event data is collected in different time periods, wherein the different time periods are defined in different time intervals on the order of hours, days, weeks, or months.

5. The method of claim 1, further comprising providing a temporal insight for display on the user interface, wherein the temporal insight comprises a suggested timing for a user to deliver the next message to the specific HCP, and wherein the suggested timing comprises a specific time or timeslot on a specific day(s) of a week or month.

6. The method of claim 1, further comprising providing a contextual insight for display on the user interface, wherein the contextual insight comprises a-suggested topics, subjects, or keywords for the next message.

7. The method of claim 6, wherein the topics, subjects, or keywords are determined to be of interest or relevance to the specific HPC based at least on the demographic data, and wherein the demographic data further comprises: (1) information about the specific HCP obtained directly or indirectly from a plurality of sources; (2) information about one or more conferences or events that the specific HCP has attended, is attending, or planning to attend; (3) articles written or published by the specific HCP; (4) talks or presentations given by the specific HCP; (5) online content posted by the specific HCP; or (6) news, reviews, or articles about the specific HCP posted by third parties or individuals affiliated with the specific HCP.

8. The method of claim 1, wherein the trained ML algorithm is further trained to determine a likelihood of modes or channels of communications for a user to effectively engage or interact with the specific HCP.

9. The method of claim 8, wherein the modes or channels of communications comprise one or more of the following: (1) email communications; (2) mobile text messages; (3) social media websites; (4) mobile applications; (5) telephone calls; (6) in-person meetings; (7) video conferencing; (8) conferences or seminars; or (9) events conducted at the specific HCP's work facility.

10. The method of claim 1, further comprising:
providing one or more recommendations for eliciting the target interaction to one or more devices associated with a user; and
displaying the one or more recommendations as one or more visual graphical objects on the one or more devices associated with the user.

11. The method of claim 10, wherein the one or more visual graphical objects are configured to allow the user to perform one or more of the following actions: (1) accept the one or more recommendations; (2) reject the one or more recommendations; (3) mark the one or more recommendations with a status marker; or (4) provide feedback on the one or more recommendations.

12. The method of claim 1, wherein the trained ML algorithm is used to generate a decision model, wherein the decision model is used to determine the next message.

13. The method of claim 12, wherein the decision model is based on (1) individual historical behavior of the specific HCP with respect to electronic messages sent by a user and (2) aggregated historical behaviors of a population of different HCPs with respect to electronic messages sent by a plurality of different users.

14. The method of claim 12, wherein the trained ML algorithm is selected from a group consisting of a boosted decision tree, a classification tree, a regression tree, a bagging tree, a random forest, a neural network, and a rotational forest.

15. The method of claim 12, further comprising:
providing, to the decision model, new HCP data associated with one or more new interactions taken by the specific HCP in response to the next message sent by a user to the specific HCP; and
training the decision model using the new HCP data.

16. A system for eliciting a target interaction with a user interface, the system comprising:
a server; and
a memory storing instructions that, when executed by the server, cause the server to perform operations comprising:
(a) receiving event data, segmentation data, and demographic data from a computer storage module, wherein the event data comprises a plurality of previous interactions with a plurality of previous electronic messages by a plurality of healthcare providers (HCPs), wherein the segmentation data comprises a category of each HCP by scientist, researcher, technician, physician, nurse, nurse practitioner, or pharmacist, and wherein the demographic data comprises a profile of each HCP by location, age, education, location, or ethnicity;
(b) determining a likelihood of a next set of electronic messages being opened by each HCP in (1) a specific category of the segmentation data and (2) a specific location of the demographic data, wherein the determining comprises:
(i) processing the event data into a target vector wherein the target vector comprises an output variable for each interaction of the plurality of previous interactions,
(ii) processing the segmentation data and the demographic data into a design matrix, wherein the design matrix comprises (1) an input variable for each data of the segmentation data and (2) an input variable for each data of the demographic data,
(iii) executing a trained machine learning (ML) algorithm to fit a fitting function between the target vector and the design matrix,
(iv) using the fitting function to determine at least an engagement score for each message of the next set of electronic messages, wherein the determining comprises calculating a conditional probability for each message being opened by each HCP based at least on the specific category of the segmentation data and the specific location of the demographic data, and
(v) determining a message sequence of the next set of electronic messages, wherein the determining comprises ordering the message sequence by the determined engagement scores that satisfy a threshold amount;
(c) determining to publish a next message of the message sequence for display on the user interface based at least on satisfying the threshold amount for a specific HCP in the specific category of the segmentation data and the specific location of the demographic data;
(d) sending the next message to the specific HCP in response to determining to publish the next message on the user interface;
(e) after sending the next message to the specific HCP, determining to terminate sending another message of the message sequence to the specific HCP based at least on (i) eliciting the target interaction or (ii) not satisfying the threshold amount; and
(f) terminating sending another message of the message sequence to the specific HCP in response to determining to terminate sending another message.

17. A non-transitory computer-readable storage medium including instructions that, when executed by a server, cause the server to perform operations comprising:
(a) receiving event data, segmentation data, and demographic data from a computer storage module, wherein the event data comprises a plurality of previous interactions with a plurality of previous electronic messages by a plurality of healthcare providers (HCPs), wherein the segmentation data comprises a category of each HCP by scientist, researcher, technician, physician, nurse, nurse practitioner, or pharmacist, and wherein the demographic data comprises a profile of each HCP by location, age, education, location, or ethnicity;
(b) determining a likelihood of a next set of electronic messages being opened by each HCP in (1) a specific category of the segmentation data and (2) a specific location of the demographic data, wherein the determining comprises:
(i) processing the event data into a target vector, wherein the target vector comprises an output variable for each interaction of the plurality of previous interactions,
(ii) processing the segmentation data and the demographic data into a design matrix, wherein the design matrix comprises (1) an input variable for each data of the segmentation data and (2) an input variable for each data of the demographic data,
(iii) executing a trained machine learning (ML) algorithm to fitting a function between the target vector and the design matrix, (iv) using the fitting function to determine at least an engagement score for each message of the next set of electronic messages, wherein the determining comprises calculating a conditional probability for each message being opened by each HCP based at least on the specific category of the segmentation data and the specific location of the demographic data, and (v) determining a message sequence of the next set of electronic messages, wherein the determining comprises ordering the message sequence by the determined engagement scores that satisfy a threshold amount;

(c) determining to publish a next message of the message sequence for display on the user interface based at least on satisfying the threshold amount for a specific HCP in the specific category of the segmentation data and the specific location of the demographic data;

(d) sending the next message to the specific HCP in response to determining to publish the next message on the user interface;

(e) after sending the next message to the specific HCP, determining to terminate sending another message of the message sequence to the specific HCP based at least on (i) eliciting the target interaction or (ii) not satisfying the threshold amount; and (f) terminating sending another message of the message sequence to the specific HCP in response to determining to terminate sending another message.

18. The method of claim 1, wherein (b) further comprises:

generating a plurality of clusters of the next set of electronic messages by clustering the next set of electronic messages by purpose, by subject, by title, or temporally;

selecting a cluster of the plurality of clusters of the next set of electronic messages based at least on the specific category of the segmentation data and the specific location of the demographic data; and executing the trained ML algorithm to determine an engagement score for the selected cluster that satisfies a threshold amount, wherein determining the threshold amount comprises generating an area under a curve (AUC) of a receiver operating characteristic (ROC) curve for each electronic message of the selected cluster of the plurality of clusters.

19. The method of claim 1, further comprising, responsive to eliciting the target interaction, using the one or more processors, updating the event data with (i) the next message and (ii) the target interaction.

* * * * *